(12) United States Patent
Suzuki

(10) Patent No.: US 10,852,877 B2
(45) Date of Patent: Dec. 1, 2020

(54) SYSTEM, APPARATUS AND METHOD FOR COMMUNICATING TOUCH DATA

(71) Applicant: Intel Corporation, Santa Clara, CA (US)

(72) Inventor: Nobuyuki Suzuki, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 746 days.

(21) Appl. No.: 15/461,864

(22) Filed: Mar. 17, 2017

(65) Prior Publication Data

US 2018/0267661 A1    Sep. 20, 2018

(51) Int. Cl.
*G06F 3/041*    (2006.01)
*G09G 5/00*    (2006.01)
*G06T 1/20*    (2006.01)

(52) U.S. Cl.
CPC .......... *G06F 3/0416* (2013.01); *G09G 5/006* (2013.01); *G06F 2213/0038* (2013.01); *G06T 1/20* (2013.01); *G09G 2310/08* (2013.01)

(58) Field of Classification Search
CPC .. G06F 3/0416; G06F 3/14; G06F 2213/0038; G09G 5/006; G09G 2310/08; G09G 2320/08; G09G 2354/00; G09G 2370/022; G09G 2370/045; G06T 1/20
See application file for complete search history.

(56) References Cited

U.S. PATENT DOCUMENTS

2012/0056822 A1*    3/2012    Wilson .................. G06F 3/0418
                                                                345/173
2016/0170548 A1    6/2016    Suzuki

OTHER PUBLICATIONS

Universal Stylus Initiative, "Universal Stylus Initiative Releases Breakthrough Specification 1.0," Sep. 22, 2016, 3 pages.

* cited by examiner

*Primary Examiner* — Nelson M Rosario
(74) *Attorney, Agent, or Firm* — Trop, Pruner & Hu, P.C.

(57) ABSTRACT

In one embodiment, a processor includes at least one core and at least one graphics processor. The processor includes: a display host controller to control a display device coupled to the processor; a touch host controller to control a touch device coupled to the processor; a traffic controller to multiplex first information from the display host controller and second information from the touch host controller; and a physical unit circuit to communicate the first information and the second information via a plurality of first data lanes of an interconnect to couple to at least one device controller, a clock signal via a clock lane of the interconnect, and receive touch data from the at least one device controller via a second data lane of the interconnect. Other embodiments are described and claimed.

20 Claims, 11 Drawing Sheets

SYSTEM, APPARATUS AND METHOD FOR COMMUNICATING TOUCH DATA

TECHNICAL FIELD

Embodiments relate to interconnect technology and more specifically to interconnect technology for communication of touch data.

BACKGROUND

Touch screens and touch pads are two examples of touch interfaces by which a user may interact with any of the variety of processing-capable platforms. As more users adopt smartphones, tablet computers and other touch interface-enabled devices, user interaction with a computing device via a touchpad, touch screen or other human input device (HID) increases. Commonly, a touch input device is implemented via an array of sensors to which analog circuitry is coupled to detect user touch and provide this information to a touch controller, which typically is implemented using digital circuitry. In general, this touch controller operates to receive inputs from one or more analog circuits that connect to the touch array and determine touch locations, filter false touches, and provide an HID packet for output to other circuitry of the device such as a host processor. Current interfaces between touch circuitry and a host processor often utilize multiple communication protocols which can increase complexity and power consumption, and can further raise routing issues.

DETAILED DESCRIPTION

Embodiments provide techniques and/or mechanisms to communicate information, generated with a touch sensor array, to digital signal processor circuitry. In one embodiment, a touch serial interface (TSI) including differential physical layer (PHY) functionality may provide for a high speed, low voltage mechanism that enables digital processing to be offloaded from touch controller circuitry. Such touch controller circuitry may be implemented as an integrated circuit (IC), packaged device and/or other hardware that includes analog touch sensor circuitry logic. For example, the digital processing of touch sensor information may be offloaded to be performed at a system on chip (SoC) that is coupled to touch sensor controller circuitry via a differential PHY (D-PHY).

Still further; embodiments provide techniques and/or mechanisms to leverage a single communication protocol for communication of all of control, data and clocking information between a touch and display integrated device integrated circuit (TDDI) or other control circuitry and an SoC. This TDDI is an IC that may include control circuitry for both a touch device and a display device. Communications via this interface may include: communication of control and configuration information from the SoC to the TDDI to configure a touch device and/or a display device; reporting of configuration information from the touch device and/or display device to the SoC; communication of touch data from the touch device to the SoC; and communication of display data from the SoC to the display device.

In one particular embodiment, communication of touch data from the touch device to the SoC, may be via a D-PHY data lane having a minimum capability of a high speed reverse (HS RVS) path and a low power reverse (LP RVS) path. Still further, this communication path may transfer the touch data by HS RVS communication in a manner synchronized with a clock signal, e.g., a high-speed clock (HS CLK) communicated in the forward direction. In this way, embodiments may reduce pin count for communication of touch data, while achieving a high data rate, e.g., 1 gigabit per second (Gbps). Still further, embodiments may reduce or remove clock architecture complexity in the TDDI, as it can use an incoming high-speed clock signal from, e.g., a host display controller.

Figure 1:
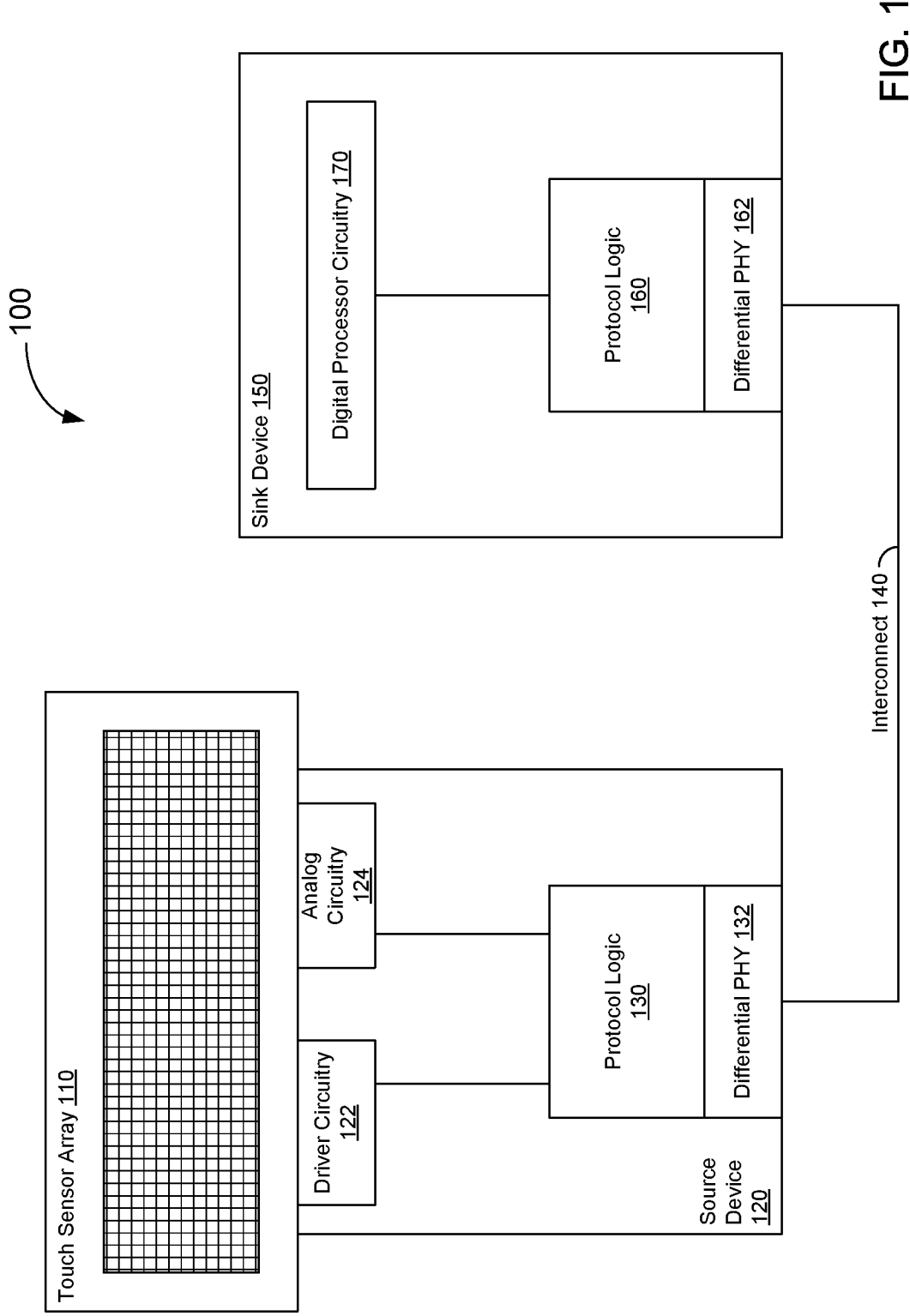
FIG. 1 is a high-level functional block diagram illustrating elements of a system for processing touch sensor information according to an embodiment.

Referring now to FIG. 1, shown is a block diagram of a system in accordance with an embodiment of the present invention. System 100 includes a source device 120 coupled to a touch sensor array 110. In an embodiment, source device 120 may be a TDDI as described herein to generate data representing a user interaction with touch sensor array 110. Touch sensor array 110 may include, for example, a given capacitance touch sensor element. However, the particular type of sensor elements included in touch sensor array 110 is not limited in this regard.

Source device 120 may include circuitry to operate touch sensor array 110. By way of illustration and not limitation, driver circuitry 122 may control activation of individual sensor elements of touch sensor array 110. Alternatively or in addition, such circuitry may include analog circuitry 124 to receive analog output signals that are based on activation of such touch sensor elements and a user's interaction with touch sensor array 110.

System 100 may support a high throughput interface to communicate touch information from source device 120 to digital processing logic that is included in or coupled to system 100. For example, source device 120 may be coupled via an interconnect 140 to a sink device 150 of system 100, which may be a processor or other SoC. Source device 120 and sink device 150 may serve as a "source" and "sink," respectively, at least with respect to communication of touch sensor information. However, certain embodiments may further support other communications where source device 120 and sink device 150 function as sink and source, respectively.

In embodiments source device 120, e.g., as implemented as TDDI, may be distinct from another IC and/or data package including sink device 150, e.g., where sink device 150 resides in a SoC that is coupled to source device 120 via interconnect 140. In one embodiment, interconnect 140 couples a differential PHY 132 of source device 120 to a differential PHY 162 of sink device 150. Communication between PHYs 132, 162 may be characterized by an embedded clock signal, low voltage (e.g., at or below 1400 millivolts signal amplitude), bidirectional channel control.

Operation of, and communication between, differential PHYs 132, 162 may be based on (e.g., meet some or all requirements of) any of a variety of D-PHY standards including, for example, a D-PHY standard of the Mobile Industry Processor Interface (MIPI)® Alliance. Examples of such MIPI® D-PHY standards include the MIPI® D-PHY v1.0 standard released Sep. 22, 2009 by the MIPI® Alliance, the MIPI® D-PHY v1.1 standard approved Dec. 16, 2011 by the MIPI® Alliance and the MIPI® D-PHY v1.2 standard introduced in September, 2014 by the MIPI® Alliance. In some embodiments, PHYs 132, 162 are based on a low-power physical layer standard such as that of the MIPI® Alliance Specification for M-PHY$^{SM}$ Version 1.00.00 of Feb. 8, 2011 and approved on Apr. 28, 2011. In still other embodiments, PHYs 132, 162 are based on a physical layer standard for camera and/or display interfaces such as that of the MIPI® Alliance Specification for C-PHY™ Version 1.0 released September 2014. In some cases, a Universal Stylus Initiative Touch Serial Interface (TSI) protocol may also be adapted for use.

Source device 120 may include analog-to-digital (A/D) conversion logic, e.g. included in or coupled to analog circuitry 124, to prepare at least in part for the communication of digitized touch information via differential PHY 132. In turn, sink device 150 may perform certain types of digital processing of information generated with touch sensor array 110, e.g., where such processing includes operations to generate an interrupt message to be sent to a software process (e.g., an operating system process) or a firmware process of system 100 (or of logic coupled to system 100). For example, system 100 may be a touch sensor subsystem of a larger platform (not shown) including a host processor and/or other logic configured to receive a human interface device (HID) event interrupt directly or indirectly from sink device 150. Sink device 150 may perform one or more operations including identifying that an interrupt is to be generated in response to identification of an occurrence of a gesture event, where identification of such occurrence of the gesture event is based on the output from the touch sensor array 110. In an embodiment, any such identifying that the interrupt is to be generated is performed only after the first touch sensor data is received by sink device 150 via interconnect 140.

By way of illustration and not limitation, sink device 150 may perform operations to detect for the occurrence of a touch event and/or a gesture event. Some processing in aid of identifying a gesture event and/or a touch event may take place at source device 120. For example, noise suppression processing, data segmentation processing, etc., may be performed at source device 120, where partially pre-processed touch information generated by such processing is sent to sink device 150. The pre-processed touch information may include data identifying touch interface coordinates that currently correspond to a particular touch status. However, actual evaluation of such partially pre-processed touch information to identify a gesture event (and in some embodiments, a touch event) may take place only at sink device 150. And as described further herein, in some embodiments graphics processing circuitry of sink device 150 may perform touch processing of the received touch data.

A touch event may be detected, for example, by digital processor circuitry 170 evaluating touch sensor information from source device 120, where such evaluating is based on a priori reference information including one or more touch event criteria. In one embodiment, processing to detect for a touch event includes digital processor circuitry 170 comparing touch sensor information to such touch event criteria information. Based on such evaluation, it may be determined, for example, whether one or more thresholds have been exceeded, e.g., by a size of an area of touch sensor array 110 that is under pressure, a magnitude of such pressure, a rate of change of such pressure, a duration of such pressure and/or the like. Where the exceeding of the one or more thresholds is indicated, digital processor circuitry 170 may indicate to an agent (not shown) that a touch event has been detected.

A gesture event may be detected, for example, based on multiple touch events. By way of illustration and not limitation, a sequence of detected touch events may be evaluated based on a priori reference information including one or more gesture event criteria, e.g., including comparing information describing the sequence of touch events to the gesture event criteria information. Based on such evaluation, it may be determined, for example, whether one or more reference gesture conditions have been satisfied, e.g., by a rate of change of the sequence, a duration of the sequence, a concurrency or other relationship of the sequence to a different sequence and/or the like. Where such one or more characteristics have been satisfied, digital processor circuitry 170 may indicate to a host processor, display controller or other agent (not shown) that a particular gesture event has been detected. Detection of a touch event and/or a gesture event may be based, for example, on operations adapted from conventional touch and/or gesture detection techniques, which are not detailed herein and are not limiting on certain embodiments. In some embodiments, identification of the occurrence of a touch event and/or a gesture event may be performed at source device 120, e.g., where sink device 150 subsequently determines based on such identifying by source device 120 that an event interrupt is to be sent to executing software and/or firmware.

In an embodiment, source device 120 includes protocol logic 130 having circuitry to facilitate a protocol for an exchange via interconnect 140 of information that is based on, and/or is to facilitate, operation of touch sensor array 110. For example, protocol logic 130 may support preparation of touch information, generated with analog circuitry 124, for communications via differential PHY 132, e.g., based on a MIPI® D-PHY standard. Alternatively or in addition, protocol logic 160 of sink device 150 may have circuitry to further facilitate such a protocol. For example, protocol logic 160 may support receipt of touch information via differential PHY 162, e.g., according to a MIPI® D-PHY standard. In one embodiment, protocol logic 130 and protocol logic 160 communicate with one another to variously configure one or more modes of touch sensor array 110 and/or source device 120 and to provide touch data from touch sensor array 110 to sink device 150, and to provide display data from sink device 150 to source device 120 for communication to a coupled display device.

In supporting communications that are based on a differential PHY standard, such as any of various MIPI® D-PHY standards, system 100 allows for high speed transfer of "raw" touch information to circuitry that provides digital processing functionality. Moreover, as D-PHY applies a high-speed differential signaling, it dramatically reduces the risk of electromagnetic interference in such high-speed communications.

Figure 2:
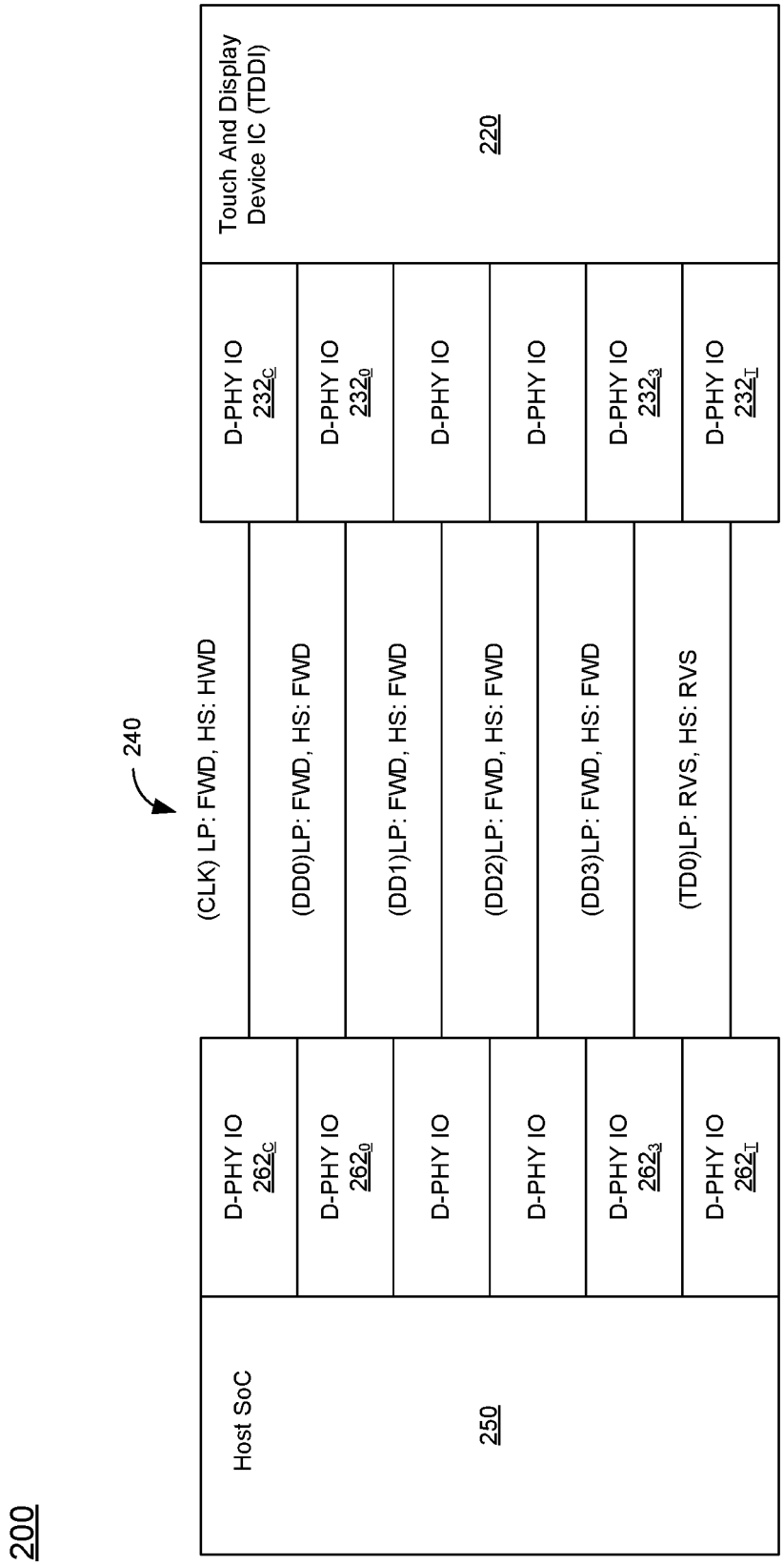
FIG. 2 is a block diagram showing further details of a system arrangement in accordance with an embodiment of the present invention.

Referring now to FIG. 2, shown is a block diagram showing further details of a system arrangement in accordance with an embodiment of the present invention. As shown in FIG. 2, system 200 includes a host SoC 250 coupled to a TDDI 220 in accordance with an embodiment. As illustrated, an interconnect 240 couples the devices together. Communications between SoC 250 and TDDI 220 may occur via a packet-based communication protocol in accordance with a MIPI® Display Serial Interface (DSI) specification, or another such protocol. Also, note that PHY-level signals like escape mode entry code can be used for communications, such as interrupt signaling from TDDI 220 to SoC 250.

In the high level shown in FIG. 2, host SoC 250 includes a plurality of independent physical unit circuits, namely a plurality of D-PHY input/output (IO) circuits $262_C$, $262_0$-$262_3$ and $262_T$. Understand while shown with these particular enumerated PHY circuits in the embodiment of FIG. 2, more or fewer such circuits may be present in a given embodiment. At a minimum, an implementation may include a PHY IO circuit $262_C$ to provide a physical unit interface for clock communication and at least one data PHY IO circuit (e.g., $262_0$) to provide a physical unit interface for data communication. Still further, embodiments may include at least one PHY IO circuit $262_T$ to enable communication of touch data in a reverse direction.

In the embodiment shown in FIG. 2, interconnect 240 includes a plurality of independent data lanes, including a clock (CLK) data lane, a plurality of generic data lanes (DD0-DD3) and a touch data lane (TD0). In an embodiment, all lanes may be configured for low power operation and/or for high speed (HS) operation. As further illustrated, CLK lane and DD0-DD3 lanes may be configured for forward (FWD) communication in a forward direction. In turn, touch data lane TD0 may be configured for reverse (RVS) direction communication at low power and/or high speed. Still referring to FIG. 2, in turn TDDI 220 includes a plurality of independent physical unit IO circuits $232_C$, $232_0$-$232_3$ and $232_T$.

In the embodiment of FIG. 2, interconnect 240 is implemented using a MIPI DSI configuration with one clock (CLK) lane and one to four data lanes (here DD0, DD1, DD2 and DD3). In an embodiment, display control data is transferred via the data lanes with the high-speed forward clock signal. In turn, touch data is transferred in a reverse direction via touch data lane (TD0), accompanied with the high-speed clock (or subsampled clock) received from the host SoC. Note that this reverse direction high-speed data transmission is not contemplated in current MIPI DSI implementations.

Figure 3:
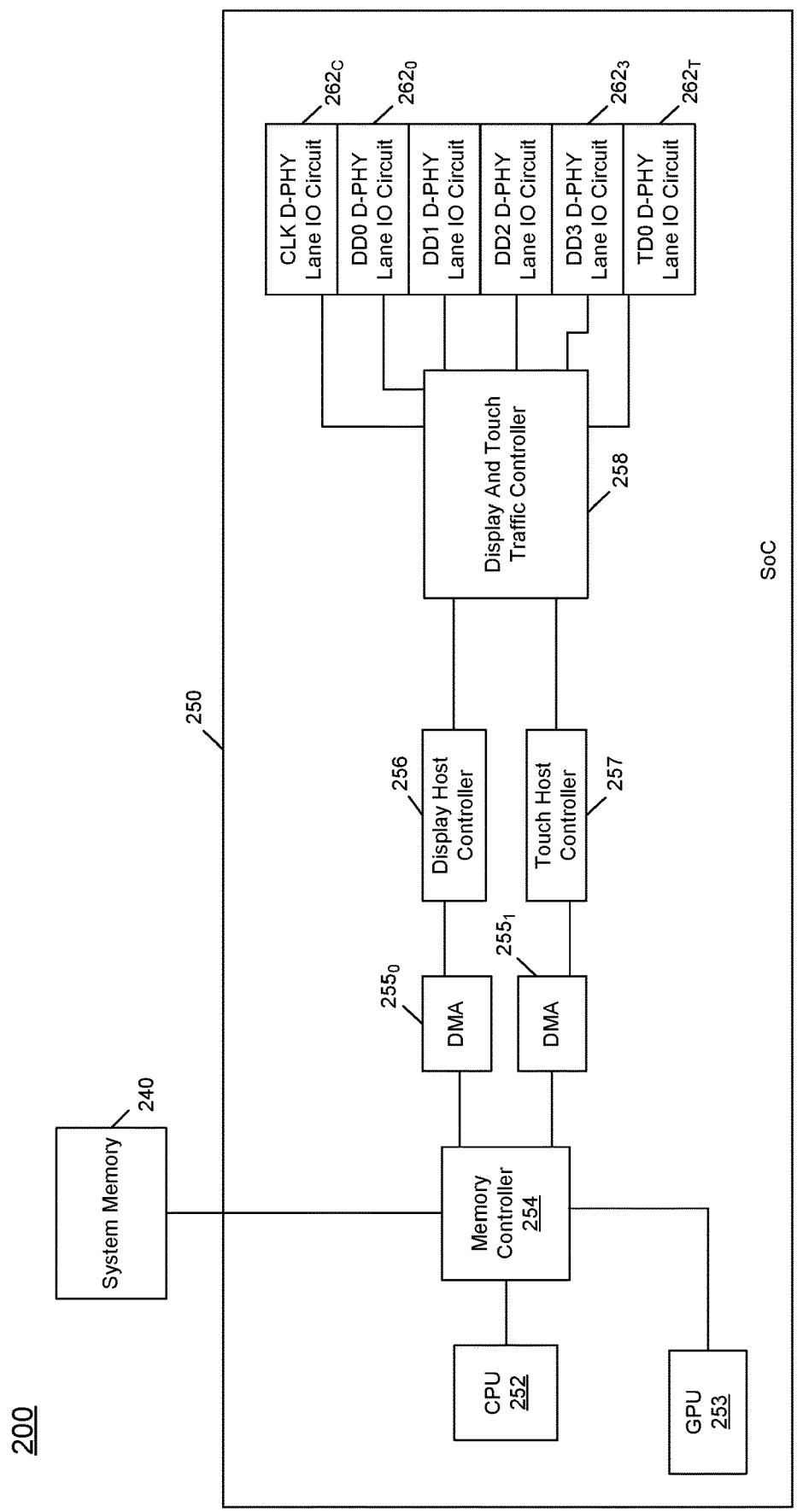
FIG. 3 is a block diagram of a portion of a system in accordance with an embodiment.

Referring now to FIG. 3, shown is a block diagram of a portion of a system in accordance with an embodiment. More specifically in FIG. 3, system 200 includes SoC 250 shown in further detail. SoC 250, which may be a multi-core processor, includes a central processing unit (CPU) domain 252 that may include one or more processing cores and a graphics processing unit (GPU) domain 253 that may include one or more graphics processing units. As illustrated, CPU domain 252 and GPU domain 253 couple to a memory controller 254 that provides interface and control circuitry to interact with a system memory 240, which may be implemented as dynamic random access memory (DRAM).

Still referring to FIG. 3, memory controller 254 interfaces with multiple direct memory access (DMA) agents $255_0$, $255_1$, each of which interacts with a corresponding host controller. Specifically, DMA agent $255_0$ interfaces with a display host controller 256 that may be a primary controller for display activities with regard to a display device of system 200. In turn, DMA agent $255_1$ interfaces with a touch host controller 257 that may be a primary controller for touch activities with regard to a touch device of system 200.

As further illustrated, a display and touch traffic controller 258 (also referred to herein as a "host traffic controller") is configured to interface between display host controller 256 and touch host controller 257, respectively, and corresponding D-PHY IO circuits 262. To this end, host traffic controller 258 may include multiplexing and control mechanisms to identify incoming signals in both directions, process such signals and provide information to appropriate destinations, both in forward (from SoC to TDDI) and reverse (TDDI to SoC) directions. Display host controller 256 and touch host controller 257 each may have its own DMA agent 255 to manage the data traffic. To this end, DMA agent $255_0$ for display host controller 256 may be configured to fetch screen image data, e.g., from system memory 240, and transmit it through display host controller 256 to the display device, while touch host controller 257 may direct received touch data from the touch device to system memory 240 via DMA agent $255_1$ for further processing in CPU 252.

Traffic controller 258 is configured to multiplex all display and touch traffic. More specifically, outgoing data from host SoC 250 is transferred over data lanes (DD0, DD1, DD2, and DD3) accompanied by the high-speed clock (CLK) via the clock lane. On the other hand, any incoming touch data from TDDI 220 is transferred over the TD0 data lane, to be sampled by a sub-sampled high-speed clock signal. Understand while shown at this high level in the embodiment of FIG. 3, many variations and alternatives are possible.

Figure 4:
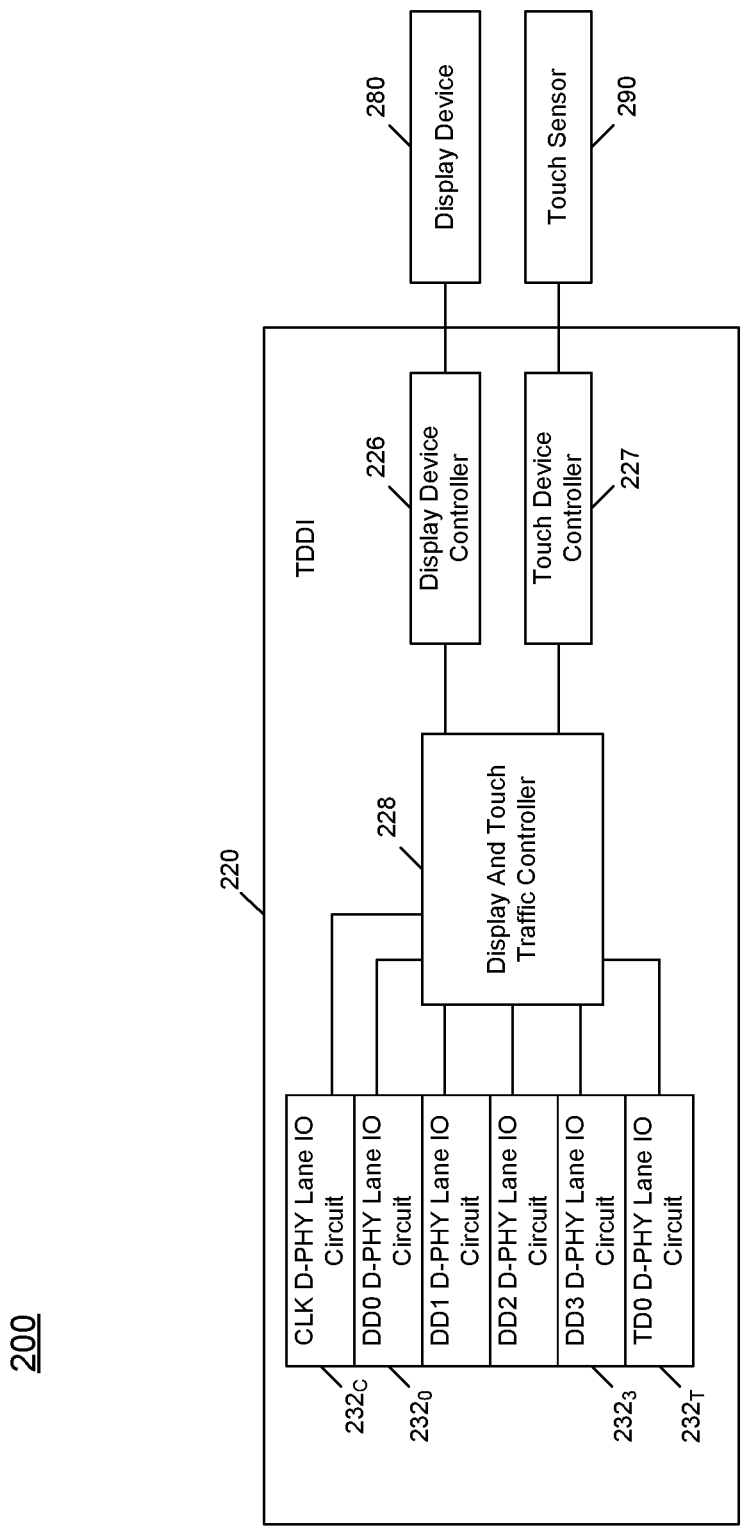
FIG. 4 is a block diagram of another portion of a system in accordance with an embodiment.

Referring now to FIG. 4, shown is a block diagram of another portion of a system in accordance with an embodiment. More specifically in FIG. 4, system 200 includes TDDI 220 shown in further detail. TDDI 220, which may be a separate IC from SoC 250, includes a display device controller 226 and a touch device controller 227. As illustrated, touch device controller 227 couples to and acts as an interface for a touch sensor 290. In turn, display device controller 226 couples to and acts as an interface for a display device 280.

As further illustrated, a display and touch traffic controller 228 (also referred to herein as a "device traffic controller") is configured to interface between display device controller 226 and touch device controller 227, respectively, and corresponding D-PHY IO circuits 232. To this end, device traffic controller 228 may include multiplexing and control mechanisms to identify incoming signals in both directions, process such signals and provide information to appropriate destinations, both in forward (from SoC to TDDI) and reverse (TDDI to SoC) directions. Traffic controller 228 multiplexes incoming display and configuration information (via the DD0-DD3 data lanes) sampled by the high-speed clock (received via the CLK lane) to display device controller 226 and touch device controller 227. And, in the outgoing direction, traffic controller 228 provides configuration data (such as current configuration settings) from display device controller 226 and touch device controller 227 to SoC 250 (via the TD0 data lane). Traffic controller 226 also may transfer touch data accompanied by the sub-sampled clock from the high-speed clock (CLK) via this TD0 data lane. In embodiments, this divided clock signal is used a source bit clock to transmit data from TDDI 220 to SoC 250.

Figure 5:
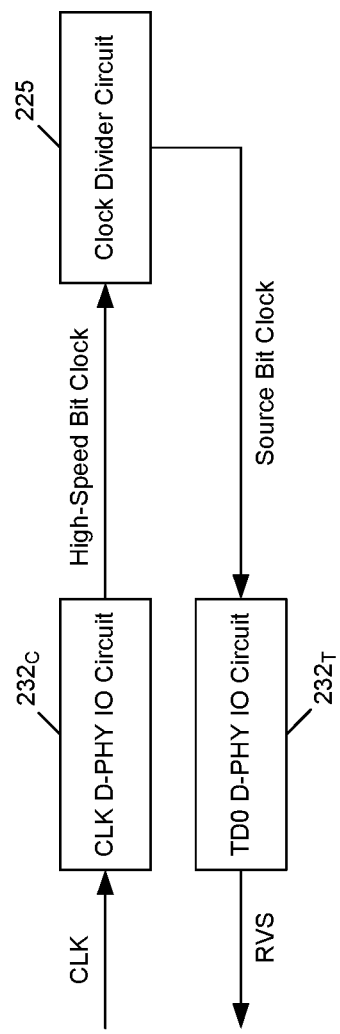
FIG. 5 is a block diagram of a clock generation arrangement in accordance with an embodiment of the present invention.

Referring now to FIG. 5, shown is a block diagram of a clock generation arrangement in accordance with an embodiment of the present invention. As illustrated in FIG. 5, a portion of TDDI 500 is shown. As seen, an incoming clock signal is received in a TDDI via a physical unit IO circuit 232$_C$, which in the embodiment shown is a D-PHY IO circuit to receive an incoming clock signal. During operation, this clock signal may be communicated at a high speed (e.g., at a frequency of 1 gigahertz (GHz)). This clock signal may be communicated to various circuitry of the TDDI, including the TDDI traffic controller and device controllers, among other circuitry. Still further, a generated clock may be derived using this incoming clock signal. More specifically as shown in FIG. 5, a clock divider circuit 225 may receive the high speed bit clock and generate one or more divided versions of the clock signal. In an embodiment, clock divider 225 may be implemented as one or more latch circuits. In a particular embodiment, clock divider circuit 225 may be configured to cause a divide by four operation, such that the output of clock divider circuit 225 is a clock signal at a lower clock frequency (namely ¼ the clock frequency of the incoming clock signal). In embodiments herein, this divided clock signal may be used as a source bit clock that can be used to clock communication of touch data from the TDDI via a corresponding D-PHY IO circuit 232$_T$.

Figure 6:
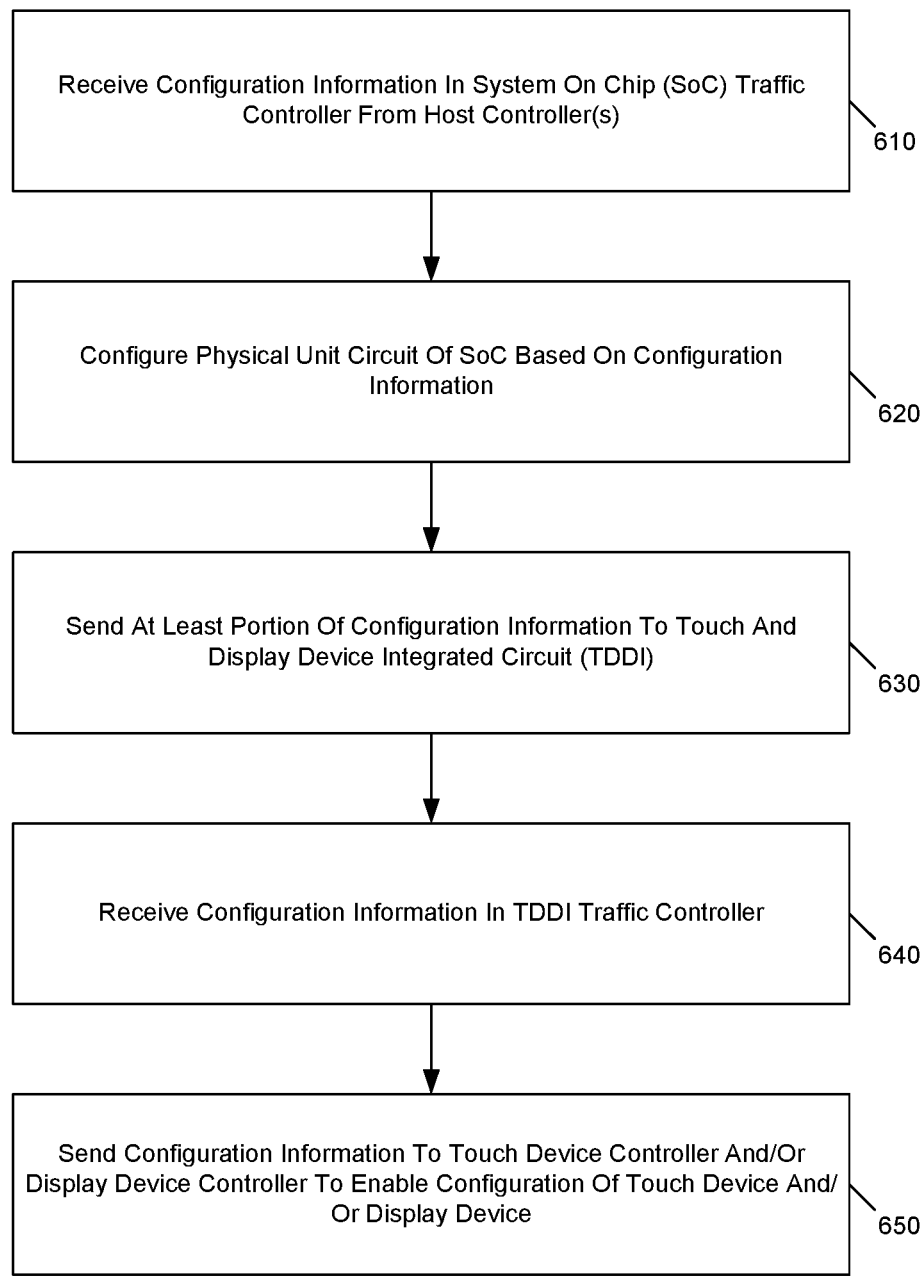
FIG. 6 is a flow diagram of a method in accordance with an embodiment of the present invention.

Referring now to FIG. 6, shown is a flow diagram of a method in accordance with an embodiment of the present invention. As shown in FIG. 6, method 600 may be performed by hardware, software, firmware and/or combinations thereof to configure one or more of a touch device controller and a display device controller of a TDDI (which in turn may configure operation of the display device and the touch device). Such configuring may be performed upon initialization or boot of a system including the TDDI. Or the configuring may be performed dynamically, e.g., due to updated system operating parameters, such as power mode, display mode or so forth.

As illustrated, method 600 begins by receiving configuration information in an SoC traffic controller from one or more host controllers (block 610). For purposes of discussion, assume that the incoming configuration information regards the touch device and thus this information is received from a host touch controller. Although the scope of the present invention is not limited in this regard, examples of such configuration information may include scan rates, operating characteristics and so forth. Other examples of configuration information may include calibration data or the touch sensor and touch device controller firmware. Next control passes to block 620 where a physical unit circuit of the SoC may be configured based on this configuration information. This is the case, as this configuration information may indicate appropriate signaling rates for communications via the physical unit circuit. Next control passes to block 630, where at least a portion of the configuration information is sent to the TDDI. In an example system such as shown above in FIG. 2, this configuration information may be communicated on one or more of data lanes DD0-DD3.

Still with reference to FIG. 6, control thereafter passes to block 640 where this configuration information is received in the TDDI traffic controller. Understand that the configuration information proceeds via the physical unit circuit of the SoC, along the data lanes of the interconnect that couples the SoC and the TDDI, and through a corresponding physical unit circuit of the TDDI before it is received in the TDDI traffic controller. Then, based on the type of configuration information (namely whether it is for the touch device controller or display device controller), the configuration information is provided to the given destination, namely touch device controller or display device controller (block 650). In turn, the given device controller may configure itself and the corresponding device based on this information. Thus at this point, the device controller(s) (and device (s)) are configured for normal operation. Understand while shown at this high level in the embodiment of FIG. 6, many variations and alternatives are possible.

Figure 7:
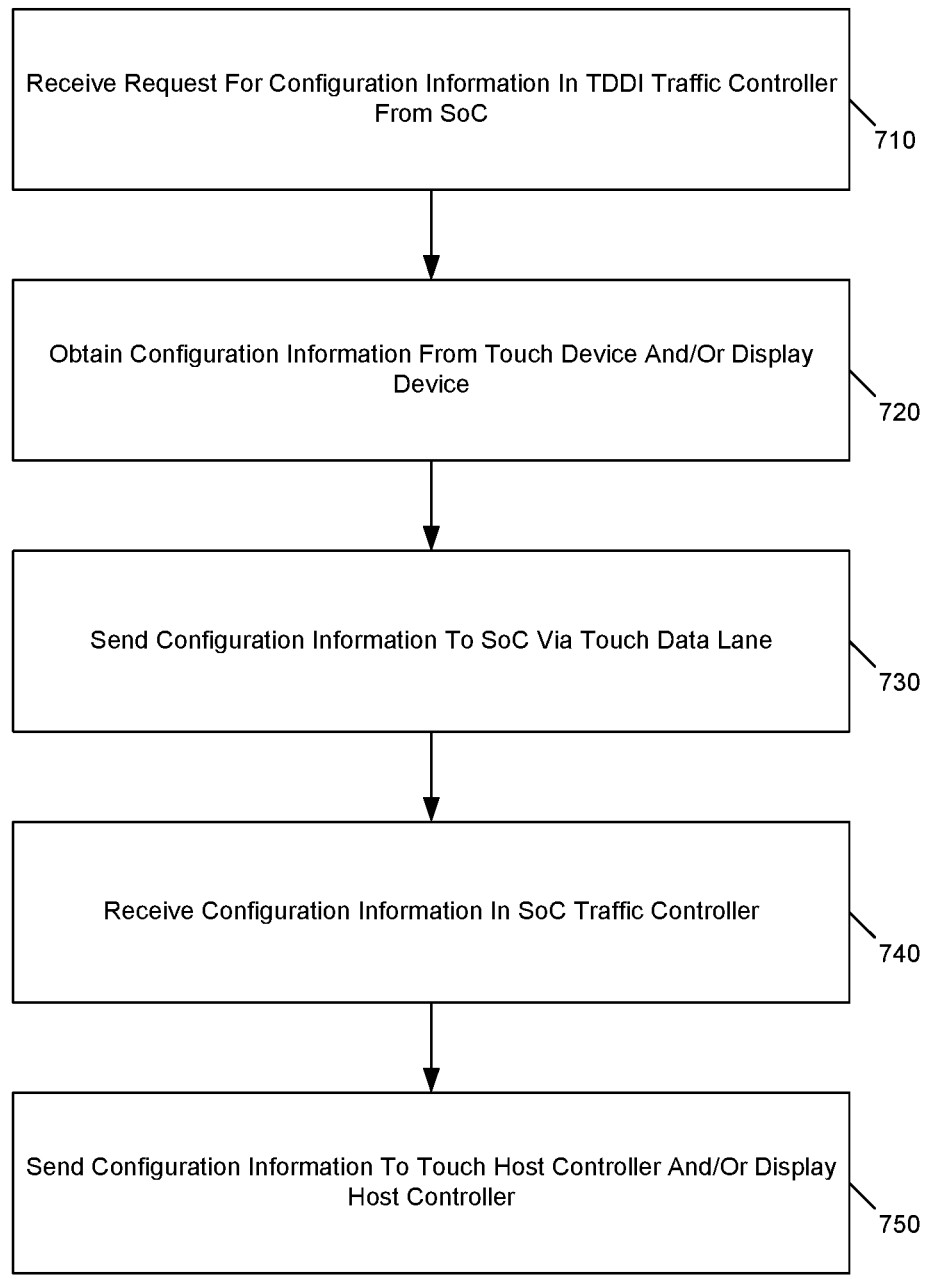
FIG. 7 is a flow diagram of a method in accordance with another embodiment of the present invention.

Referring now to FIG. 7, shown is a flow diagram of a method in accordance with another embodiment of the present invention. As shown in FIG. 7, method 700 may be performed by hardware, software, firmware and/or combinations thereof to request and receive configuration information from one or more of a touch device controller and a display device controller of a TDDI. A host controller may make such request to determine current operating parameters of a touch device controller (and touch device itself) and/or a display device controller (and display device itself).

As illustrated, method 700 begins by receiving a request for configuration information in a TDDI traffic controller from the SoC (block 710). For purposes of discussion, assume that the incoming request concerns configuration information of the touch device and thus this request is received more specifically from a host touch controller. Next control passes to block 720 where the TDDI traffic controller obtains the configuration information from the touch device (or from the touch device controller itself), in this case where the request is for touch-based configuration information. Next control passes to block 730, where the configuration information is sent to the SoC via the reverse touch data lane. In an example system such as shown above in FIG. 2, this configuration information may be communicated on reverse data lane TD0.

Still with reference to FIG. 7, control thereafter passes to block 740 where this configuration information is received in the SoC traffic controller. Understand that the configuration information proceeds via a physical unit circuit of the TDDI, along the reverse data lane of the interconnect, and through a corresponding physical unit circuit of the SoC before it is received in the SoC traffic controller. Then, based on the type of configuration information (namely whether it is for the touch device controller or display device controller), the configuration information is provided to the given destination, namely touch host controller or display host controller (block 750). In turn, the given host controller may analyze the configuration information. Understand while shown at this high level in the embodiment of FIG. 7, many variations and alternatives are possible.

Figure 8:
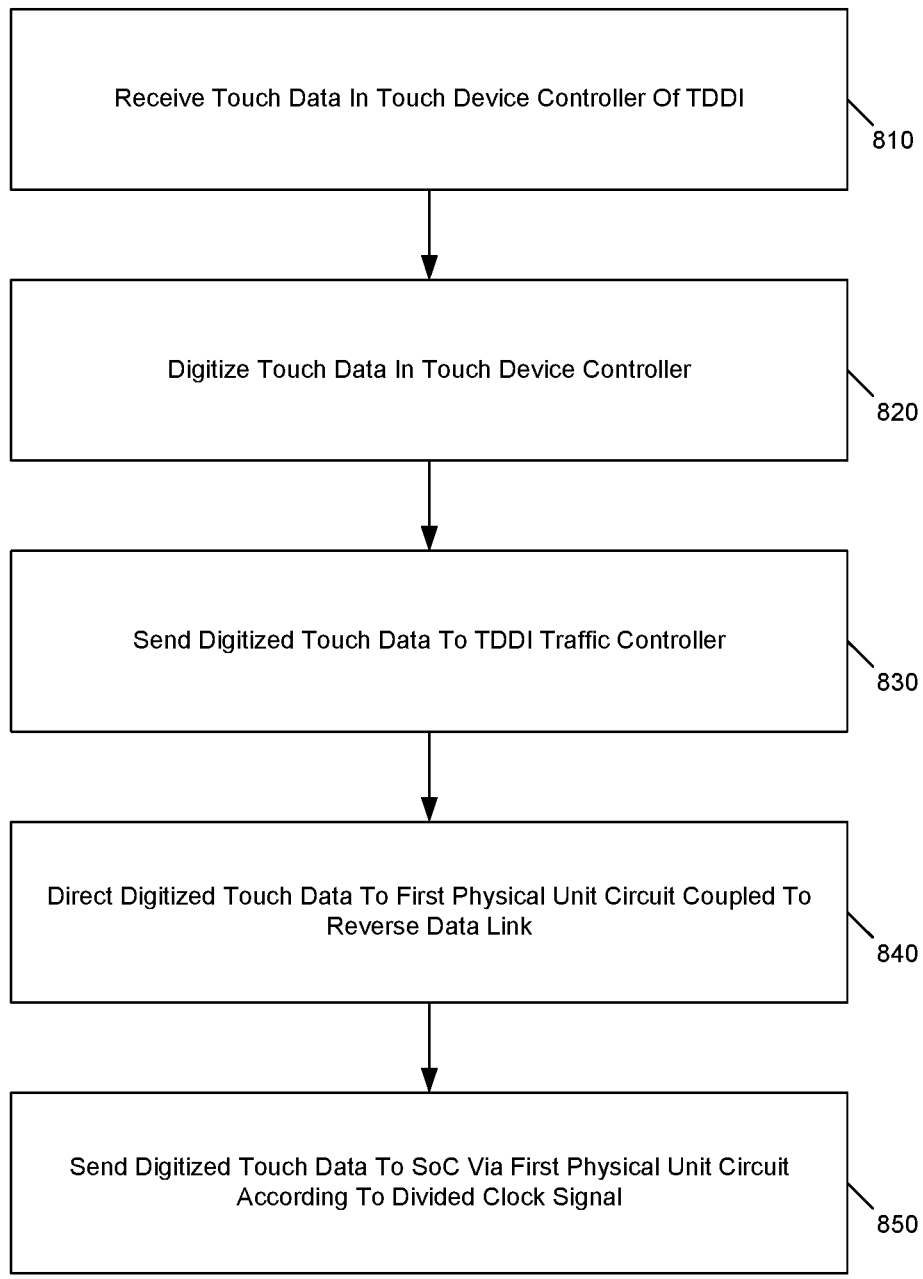
FIG. 8 is a flow diagram of a method in accordance with yet another embodiment of the present invention.

Referring now to FIG. 8, shown is a flow diagram of a method in accordance with yet another embodiment of the present invention. More specifically, method 800 is a method for handling touch data responsive to a user touch on a touch device. Accordingly, method 800 may be performed by hardware, software, firmware and/or combinations thereof to perform touch data processing.

As illustrated, method 800 begins by receiving touch data in the touch device controller of the TDDI (block 810). Understand that this received touch data may be analog signaling responsive to a user touch on the sense array, which provides analog electrical signals regarding the location, speed, pressure, direction and so forth of a user's touch. Next at block 820 this touch data may be digitized in the touch device controller. However understand that in other embodiments it may be possible for this digitization process to occur elsewhere.

In any event, control next passes to block 830 where the digitized touch data is sent to the TDDI traffic controller. The TDDI traffic controller may multiplex this touch data with other incoming information and direct the digitized touch data to the physical unit circuit of the TDDI. More specifically as illustrated at block 840 this touch data is sent to a physical unit IO circuit that is associated with the reverse data lane. Accordingly, at block 850 this digitized touch data may be sent to the SoC via this physical unit IO circuit along the reverse data lane to the SoC. Understand that in embodiments herein where no clock circuitry (or reduced or simplified clock circuitry) is present in the TDDI itself, this touch data communication may be according to a divided clock signal, namely a divided version of the clock signal sent to the TDDI from the SoC via the clock data lane. Understand while shown at this high level in the embodiment of FIG. 8, many variations and alternatives are possible.

Figure 9:
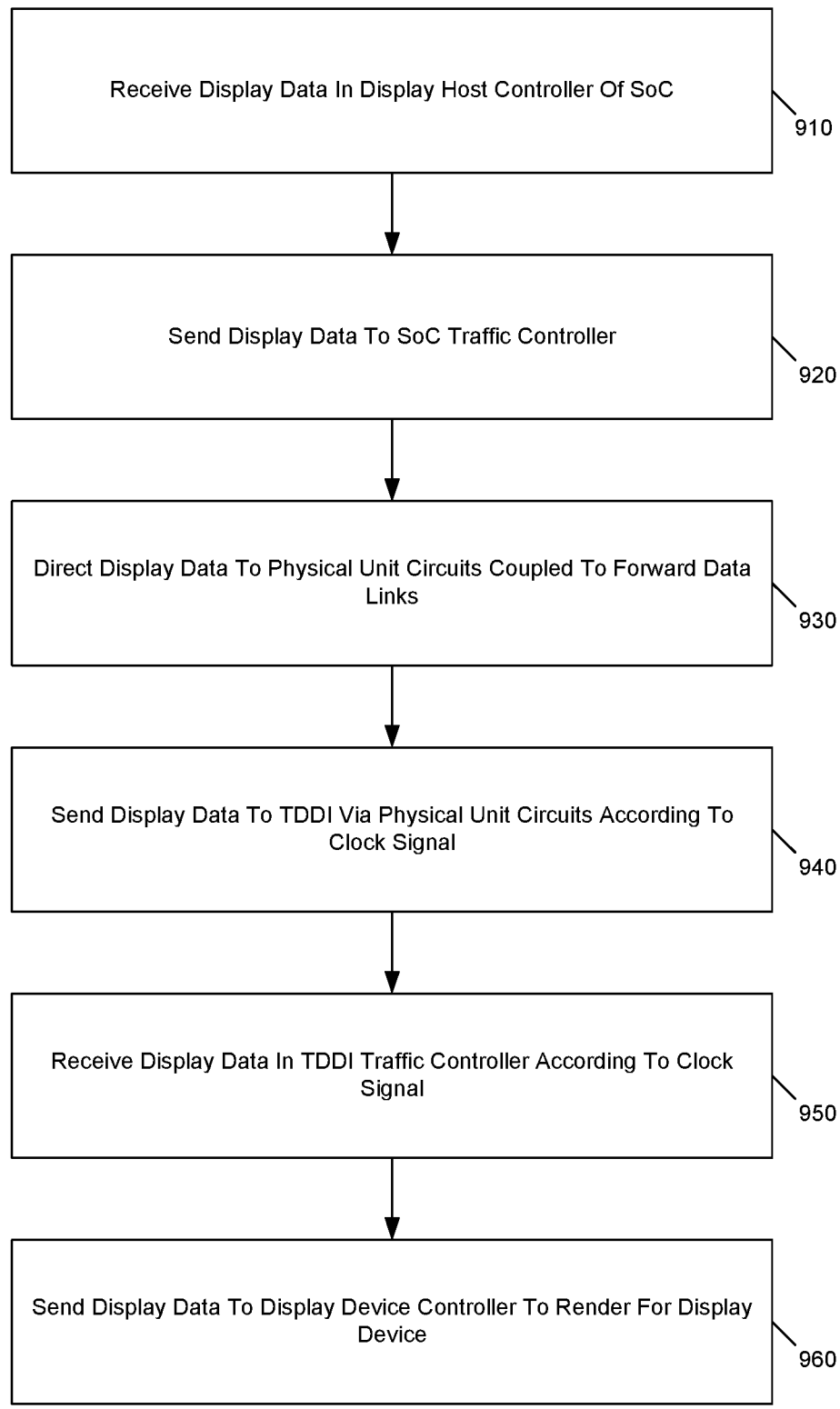
FIG. 9 is a flow diagram of a method in accordance with a still further embodiment of the present invention.

Referring now to FIG. 9, shown is a flow diagram of a method in accordance with a still further embodiment of the present invention. More specifically, method 900 is a method for communicating display data responsive to a user touch on a touch device. Accordingly, method 900 may be performed by hardware, software, firmware and/or combinations thereof to communicate and handle the display data.

As illustrated, method 900 begins by receiving display data in the display host controller of the SoC (block 910). Understand that this display data may be frame data of a given display frame received via a DMA communication with a frame buffer, e.g., stored in a system memory. Next at block 920 the display data is sent to the SoC traffic controller. The SoC traffic controller may multiplex this display data with other information and direct the display data to the physical unit circuit of the TDDI. More specifically as illustrated at block 930 this display data is sent to one or more physical unit IO circuits that are associated with forward data lanes. Accordingly, at block 940 this display data may be sent to the TDDI via these one or more physical unit IO circuits along the forward data lanes. This display data communication may be according to a clock signal that is also forwarded to the TDDI from the SoC via the clock data lane.

Still with reference to FIG. 9, control next passes to block 950 where the display data is received in the TDDI traffic controller according to the communicated clock signal. Next at block 960, the TDDI traffic controller sends the display data to the display device controller for rendering for display on the display device itself. As such, using embodiments as in FIGS. 8 and 9, touch data can be efficiently communicated in a reverse direction from a TDDI to an SoC, while in the forward direction display data can be efficiently communicated from the SoC to the TDDI for display on a display device. Understand while shown at this high level in the embodiment of FIGS. 8 and 9, many variations and alternatives are possible.

Figure 10:
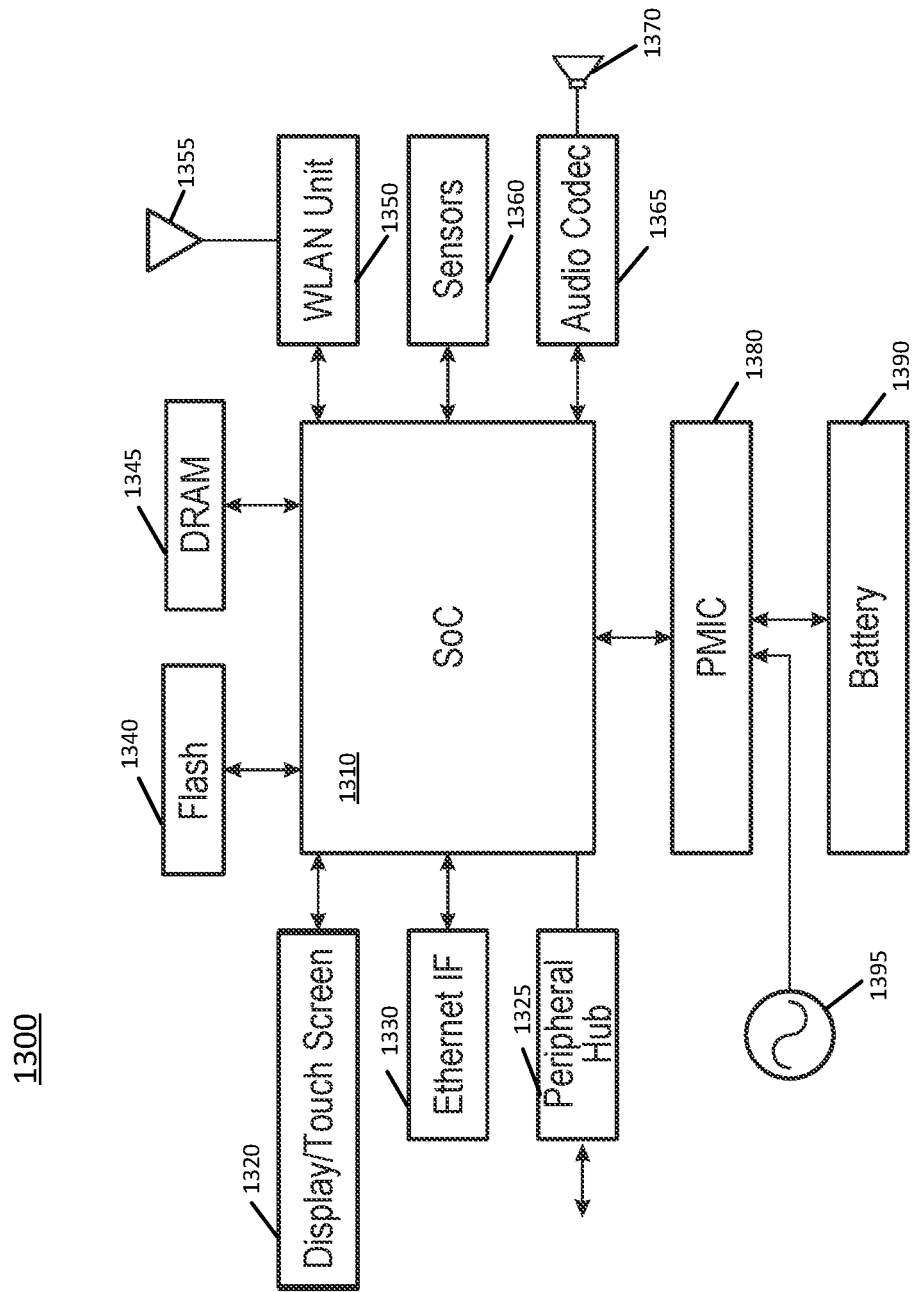
FIG. 10 is a block diagram of an example system with which embodiments may be used.

Referring now to FIG. 10, shown is a block diagram of an example system with which embodiments may be used. In the illustration of FIG. 10, system 1300 may be a mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a display/touch screen 1320 is coupled to the SoC 1310 to provide display capability and user input via touch, including provision of a virtual keyboard on a display of display/touch screen 1320. In embodiments herein, display/touch screen 1320 couples to SoC 1310 via an interconnect having at least one reverse data lane to provide touch data from display/touch screen 1320 to SoC 1310 (and forward lanes to provide clock and display data from SoC 1310 to display/touch screen 1320). To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a power management integrated circuit (PMIC) 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 10, to provide for wireless capabilities, a wireless local area network (WLAN) unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 10, many variations and alternatives are possible.

Figure 11:
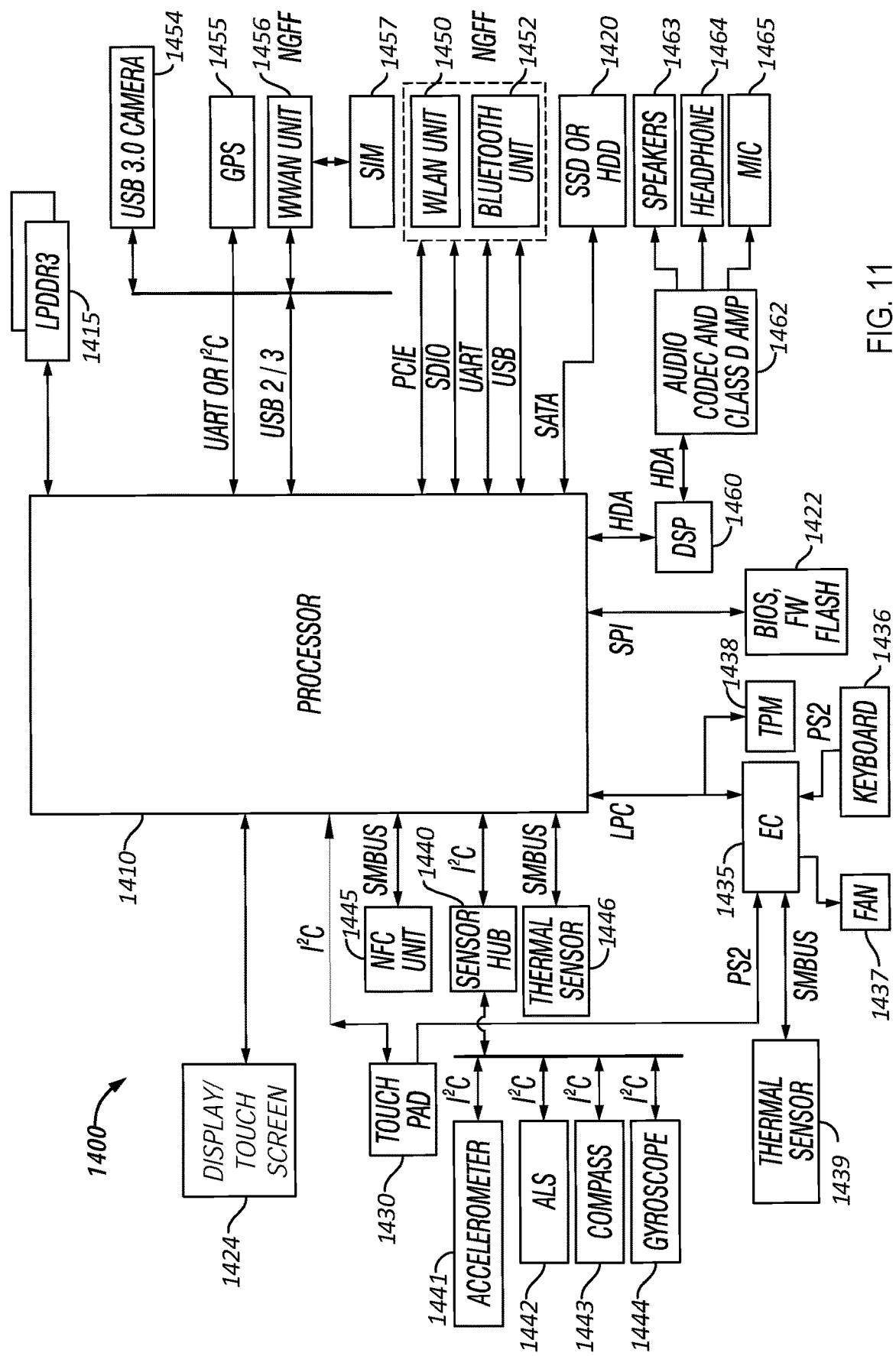
FIG. 11 is a block diagram of a representative computer system.

Referring now to FIG. 11, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400, and may include power management circuitry as described herein. Processor 1410, in one embodiment, communicates with a system memory 1415.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a solid state drive (SSD) or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 11, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 11 is a display 1424 which may be a high definition LCD or LED panel that includes a touch screen. In one embodiment, display 1424 may be coupled to processor 1410 via an interconnect as described herein to enable efficient communication of display data to display 1424 and touch data in a reverse direction to processor 1410. User input by way of touch can also occur via a touch pad 1430, which may be configured within the chassis and coupled to an I²C interconnect.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 11, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 11, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 11, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 11, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 11, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 11, understand the scope of the present invention is not limited in this regard.

The following Examples pertain to further embodiments.

In one example, a system comprises: a SoC having at least one core and at least one graphics processor. The SoC may include: a display host controller to control a display device coupled to the SoC; a touch host controller to control a touch sensor coupled to the SoC; and a first traffic controller to interface with the display host controller and the touch host controller. The system may further include an IC including: a display device controller to interface with the display device; a touch device controller to interface with the touch device; and a second traffic controller to interface with the display device controller and the touch device controller. Still further, the system may include an interconnect to couple the SoC and the IC, the interconnect comprising a plurality of lanes including: at least one first data lane to communicate at least display data from the SoC to the IC; a clock lane to communicate a clock signal from the SoC to the IC; and a second data lane to communicate at least touch data from the IC to the SoC.

In an example, the SoC comprises a first physical unit circuit including a plurality of individual first physical IO circuits to interface with the plurality of lanes.

In an example, a first individual first physical IO circuit of the plurality of individual first physical IO circuits is to communicate at least a portion of the display data in a forward direction from the SoC to the IC at a clock rate of a clock signal communicated on the clock lane.

In an example, a second individual first physical IO circuit of the plurality of individual first physical IO circuits is to receive the touch data in a reverse direction from the IC to the SoC at a second clock rate of a divided clock signal.

In an example, the IC comprises: a sampler circuit to receive the clock signal and generate a divided clock signal based on the clock signal; and a second physical unit circuit including a plurality of individual second physical IO circuits to interface with the plurality of lanes.

In an example, a first individual second physical IO circuit of the plurality of second physical IO circuits is to communicate the touch data to the SoC via the second data line according to the divided clock signal.

In an example, communication via the plurality of lanes is to be via a single communication protocol, where the single communication protocol is based on a Mobile Industry Processor Interface Display Serial Interface specification.

In an example, the first traffic controller is to multiplex first data from the display host controller and second data from the touch host controller and to provide the multiplexed first data and second data to the first physical unit circuit.

In an example, the SoC further comprises: a first DMA circuit to communicate display data from a system memory to the first traffic controller; and a second DMA circuit to communicate touch data from the first traffic controller to the system memory.

In an example, the at least one graphics processor is to receive the touch data and process the touch data to identify a user touch on the touch device.

In another example, a method comprises: communicating display data from a SoC to a TDDI via a first plurality of data lanes of a first communication protocol according to a clock signal communicated on a clock lane from the SoC to the TDDI; and communicating touch data from the TDDI to the SoC via a second data lane of the first communication protocol according to a divided clock signal, the divided clock signal based on the clock signal.

In an example, the method further comprises generating the divided clock signal in the TDDI from the clock signal.

In an example, the method further comprises: multiplexing, in a traffic controller of the SoC, the display data and the touch data, including: forwarding the display data received from a first DMA circuit to a plurality of first physical IO circuits of the SoC; and forwarding the touch data received from a second physical IO circuit of the SoC to a second DMA circuit.

In an example, the method further comprises: communicating first configuration information from the SoC to the TDDI via the first plurality of data lanes to enable the TDDI to configure a touch device controller of the TDDI based on the first configuration information; and communicating second configuration information from the SoC to the TDDI via the first plurality of data lanes to enable the TDDI to configure a display device controller of the TDDI based on the second configuration information.

In an example, the method further comprises communicating third configuration information from the TDDI to the SoC via the second data lane, in response to a request from the SoC.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, an apparatus comprises: a processor having at least one core and at least one graphics processor. The processor may include: a display host controller to control a display device coupled to the processor; a touch host controller to control a touch device coupled to the processor; a traffic controller to multiplex first information from the display host controller and second information from the touch host controller; and a physical unit circuit. In turn, the physical unit circuit may include: a first plurality of physical IO circuits to communicate the first information and the second information via a plurality of first data lanes of an interconnect to couple to at least one device controller; a clock physical IO circuit to communicate a clock signal via a clock lane of the interconnect; and a second physical IO circuit to receive touch data from the at least one device controller via a second data lane of the interconnect.

In an example, the first plurality of physical IO circuits is to communicate the first information in a forward direction from the processor to the at least one device controller at a clock rate of a clock signal communicated on the clock lane, the first information comprising display data to be displayed on the display device.

In an example, the second physical IO circuit is to receive the touch data in a reverse direction from the at least one device controller at a second clock rate of a divided clock signal, the divided clock signal generated from the clock signal, the touch data corresponding to a user touch on the touch device.

In an example, the traffic controller is to further provide the touch data to a system memory coupled to the apparatus via a direct memory access circuit and provide configuration information received from the at least one device controller to one or more of the display host controller and the touch host controller.

In an example, communication on the interconnect is to be via a single communication protocol based on a Mobile Industry Processor Interface Display Serial Interface specification.

In yet another example, an apparatus comprises: means for communicating display data from a SoC to a TDDI via a first plurality of data lanes of a first communication protocol according to a clock signal communicated on a clock lane from the SoC to the TDDI; and means for communicating touch data from the TDDI to the SoC via a second data lane of the first communication protocol according to a divided clock signal, the divided clock signal based on the clock signal.

In an example, the apparatus further comprises means for generating the divided clock signal in the TDDI from the clock signal.

In an example, the apparatus further comprises: means for selecting the display data and the touch data, including: means for forwarding the display data received from a first DMA means to a plurality of first physical IO means of the SoC; and means for forwarding the touch data received from a second physical IO means of the SoC to a second DMA means.

In an example, the apparatus further comprises: means for communicating first configuration information from the SoC to the TDDI via the first plurality of data lanes to enable the TDDI to configure a touch device control means of the TDDI based on the first configuration information; and means for communicating second configuration information from the SoC to the TDDI via the first plurality of data lanes to enable the TDDI to configure a display device control means of the TDDI based on the second configuration information.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a system on chip (SoC) having at least one core and at least one graphics processor, the SoC including:
a display host controller to control a display device coupled to the SoC;
a touch host controller to control a touch sensor coupled to the SoC; and
a first traffic controller to interface with the display host controller and the touch host controller;
an integrated circuit (IC) including:
a display device controller to interface with the display device;
a touch device controller to interface with the touch device; and
a second traffic controller to interface with the display device controller and the touch device controller; and
an interconnect to couple the SoC and the IC, the interconnect comprising a plurality of lanes including:
at least one first data lane to communicate at least display data from the SoC to the IC;
a clock lane to communicate a clock signal from the SoC to the IC; and
a second data lane to communicate at least touch data from the IC to the SoC.

2. The system of claim 1, wherein the SoC comprises a first physical unit circuit including a plurality of individual first physical input/output (IO) circuits to interface with the plurality of lanes.

3. The system of claim 2, wherein a first individual first physical IO circuit of the plurality of individual first physical IO circuits is to communicate at least a portion of the display data in a forward direction from the SoC to the IC at a clock rate of a clock signal communicated on the clock lane.

4. The system of claim 3, wherein a second individual first physical IO circuit of the plurality of individual first physical IO circuits is to receive the touch data in a reverse direction from the IC to the SoC at a second clock rate of a divided clock signal.

5. The system of claim 2, wherein the IC comprises:
a sampler circuit to receive the clock signal and generate a divided clock signal based on the clock signal; and
a second physical unit circuit including a plurality of individual second physical IO circuits to interface with the plurality of lanes.

6. The system of claim 5, wherein a first individual second physical IO circuit of the plurality of second physical IO circuits is to communicate the touch data to the SoC via the second data lane according to the divided clock signal.

7. The system of claim 2, wherein communication via the plurality of lanes is to be via a single communication protocol, wherein the single communication protocol is based on a Mobile Industry Processor Interface Display Serial Interface specification.

8. The system of claim 2, wherein the first traffic controller is to multiplex first data from the display host controller and second data from the touch host controller and to provide the multiplexed first data and second data to the first physical unit circuit.

9. The system of claim 1, wherein the SoC further comprises:
a first direct memory access (DMA) circuit to communicate display data from a system memory to the first traffic controller; and
a second DMA circuit to communicate touch data from the first traffic controller to the system memory.

10. The system of claim 1, wherein the at least one graphics processor is to receive the touch data and process the touch data to identify a user touch on the touch device.

11. A method comprising:
communicating display data from a system on chip (SoC) to a touch and display device integrated circuit (TDDI) via a first plurality of data lanes of a first communication protocol according to a clock signal communicated on a clock lane from the SoC to the TDDI; and
communicating touch data from the TDDI to the SoC via a second data lane of the first communication protocol according to a divided clock signal, the divided clock signal based on the clock signal.

12. The method of claim 11, further comprising generating the divided clock signal in the TDDI from the clock signal.

13. The method of claim 11, further comprising:
multiplexing, in a traffic controller of the SoC, the display data and the touch data, including:
forwarding the display data received from a first direct memory access (DMA) circuit to a plurality of first physical input/output (TO) circuits of the SoC; and
forwarding the touch data received from a second physical IO circuit of the SoC to a second DMA circuit.

14. The method of claim 11, further comprising:
communicating first configuration information from the SoC to the TDDI via the first plurality of data lanes to enable the TDDI to configure a touch device controller of the TDDI based on the first configuration information; and
communicating second configuration information from the SoC to the TDDI via the first plurality of data lanes to enable the TDDI to configure a display device controller of the TDDI based on the second configuration information.

15. The method of claim 14, further comprising communicating third configuration information from the TDDI to the SoC via the second data lane, in response to a request from the SoC.

16. An apparatus comprising:
a processor having at least one core and at least one graphics processor, the processor comprising:

a display host controller to control a display device coupled to the processor;

a touch host controller to control a touch device coupled to the processor;

a traffic controller to multiplex first information from the display host controller and second information from the touch host controller; and a physical unit circuit comprising:
  a first plurality of physical input/output (TO) circuits to communicate the first information and the second information via a plurality of first data lanes of an interconnect to couple to at least one device controller;
  a clock physical TO circuit to communicate a clock signal via a clock lane of the interconnect; and
  a second physical TO circuit to receive touch data from the at least one device controller via a second data lane of the interconnect.

17. The apparatus of claim 16, wherein the first plurality of physical TO circuits is to communicate the first information in a forward direction from the processor to the at least one device controller at a clock rate of a clock signal communicated on the clock lane, the first information comprising display data to be displayed on the display device.

18. The apparatus of claim 17, wherein the second physical TO circuit is to receive the touch data in a reverse direction from the at least one device controller at a second clock rate of a divided clock signal, the divided clock signal generated from the clock signal, the touch data corresponding to a user touch on the touch device.

19. The apparatus of claim 17, wherein the traffic controller is to further provide the touch data to a system memory coupled to the apparatus via a direct memory access circuit and provide configuration information received from the at least one device controller to one or more of the display host controller and the touch host controller.

20. The apparatus of claim 16, wherein communication on the interconnect is to be via a single communication protocol based on a Mobile Industry Processor Interface Display Serial Interface specification.

* * * * *

UNITED STATES PATENT AND TRADEMARK OFFICE
CERTIFICATE OF CORRECTION

Page 1 of 1

PATENT NO. : 10,852,877 B2
APPLICATION NO. : 15/461864
DATED : December 1, 2020
INVENTOR(S) : Nobuyuki Suzuki It is certified that error appears in the above-identified patent and that said Letters Patent is hereby corrected as shown below:

In the Claims

Column 16:
Line 46, Claim 13 "(TO)" should be --(IO)--;

Column 17:
Line 9, Claim 16 "(TO)" should be --(IO)--;
Line 14, Claim 16 "TO" should be --IO--;
Line 16, Claim 16 "TO" should be --IO--;
Line 20, Claim 17 "TO" should be --IO--;

Column 18:
Line 5, Claim 18 "TO" should be --IO--.

Signed and Sealed this
Nineteenth Day of January, 2021

Andrei Iancu
*Director of the United States Patent and Trademark Office*